United States Patent
Brosius, III

(10) Patent No.: US 7,898,438 B2
(45) Date of Patent: Mar. 1, 2011

(54) INTEGRATED WEATHER DISPLAY AND TRAVEL AND NAVIGATION DECISION SYSTEM

(75) Inventor: John W. Brosius, III, Fredrick, MD (US)

(73) Assignee: ClearPoint International, LLC, Oaks, PA (US)

( * ) Notice: Subject to any disclaimer, the term of this patent is extended or adjusted under 35 U.S.C. 154(b) by 279 days.

(21) Appl. No.: 12/017,810

(22) Filed: Jan. 22, 2008

(65) Prior Publication Data

US 2008/0180282 A1 Jul. 31, 2008

Related U.S. Application Data

(60) Provisional application No. 60/886,070, filed on Jan. 22, 2007.

(51) Int. Cl.
*G08G 1/123* (2006.01)
(52) U.S. Cl. ............ 340/995.27; 340/905; 340/601; 340/936
(58) Field of Classification Search ............ 340/995.27, 340/905, 995.1, 601, 602, 990, 907, 934, 340/933, 936, 968
See application file for complete search history.

(56) References Cited

U.S. PATENT DOCUMENTS

| | | | | |
|---|---|---|---|---|
| 5,488,919 A | * | 2/1996 | Ferreiro et al. | 114/122 |
| 5,959,567 A | * | 9/1999 | Wolfson et al. | 342/26 R |
| 6,275,231 B1 | * | 8/2001 | Obradovich | 345/156 |
| 6,590,529 B2 | * | 7/2003 | Schwoegler | 342/357.13 |
| 6,603,405 B2 | * | 8/2003 | Smith | 340/905 |
| 7,047,114 B1 | | 5/2006 | Rogers | |
| 2005/0251300 A1 | | 11/2005 | Hellvik | |
| 2006/0004496 A1 | * | 1/2006 | Tucker et al. | 701/4 |
| 2006/0209090 A1 | * | 9/2006 | Kelly et al. | 345/632 |
| 2006/0241862 A1 | | 10/2006 | Ichihara et al. | |

* cited by examiner

*Primary Examiner* — Daniel Previl
(74) *Attorney, Agent, or Firm* — Roylance, Abrams, Berdo & Goodman, LLP

(57) ABSTRACT

A method and apparatus for a weather information display and decision system that incorporates weather depiction charts together with other graphs and diagrams generated via a computing device on-board a vehicle (for example, a water, air and land based vehicle) as an integrated system to aid safe and comfortable vehicle navigation and handling, and provide data of immediate comprehension and use to the vehicle operator including data points on a geographic route at an applicable future time of vehicle presence and data presented from the operator's chosen perspective, using the operator's chosen frame of reference.

39 Claims, 11 Drawing Sheets

INTEGRATED WEATHER DISPLAY AND TRAVEL AND NAVIGATION DECISION SYSTEM

CROSS-REFERENCE TO RELATED APPLICATION

This application claims the benefit under 35 U.S.C. §119 (e) of U.S. Provisional Patent Application. No. 60/886,070, filed on Jan. 22, 2007, in the U.S. Patent and Trademark Office, the entire disclosure of which is hereby incorporated by reference.

FIELD OF THE INVENTION

The present application relates to weather information display and use for navigation. More particularly, the present invention relates to a weather information display and decision system that incorporates weather depiction charts together with other graphs and diagrams generated via a computing device on-board a vehicle (for example, a water, air and land based vehicle) as an integrated system to aid safe and comfortable vehicle navigation and handling, and provide data of immediate comprehension and use to the vehicle operator including data points on a geographic route at an applicable future time of vehicle presence and data presented from the operator's chosen perspective, using the operator's chosen frame of reference.

BACKGROUND OF THE INVENTION

Traditionally, according to an example, mariners and pilots obtain weather information either before departure or by voice reports delivered over radio connections. It has also been possible for mariners to receive text and simple facsimile pictorial weather diagrams transmitted on schedules by various weather services for specific regional areas of interest.

Services are emerging for delivering and presenting additional weather data to mariners and pilots while underway or in flight. This data includes image files and data array files. The latter include General Regularly distributed Information in Binary form ("GRIB") and WeatherObjects Markup Language ("wxml") data files. Data array files encode any of a number of weather values, such as wind speed and direction, wave height, direction and period, barometric pressure, sea surface temperature, and other values for each of an array of points in the area around the mariner. The GRIB file format has been standardized for worldwide distribution and use. These files require processing at the receiver end before they can be viewed meaningfully but are compact for easier transmission, and permit greater flexibility in the manner in which weather data can be manipulated and presented. The common disadvantage of existing weather delivery and display systems, however, is that the weather information must be interpreted by the mariner or pilot and mentally transformed to allow it to be used for decision making, particularly with respect to future vehicle routes.

SUMMARY OF THE INVENTION

Exemplary embodiments of the present invention address at least the above problems and/or disadvantages and provide at least the advantages described below. Accordingly, an aspect of exemplary embodiments of the present invention is to provide a means for presenting weather and other data, in combination with a vehicle navigation (for example, vessel, boat, airplane, automobile and any water, air or land based vehicle) and other data, in a novel way that is more immediately useful to the user (for example, a mariner, a pilot, driver, traveler and so on) as a decision system for choosing his or her route, scheduling the trip, handling the vehicle, and providing for increased levels of safety and comfort. This is done by automatically selecting weather data for the mariner or pilot's proposed or actual route and providing alternative presentations that make the information immediately meaningful to the mariner or pilot.

An aspect of exemplary embodiments of the present invention is to provide a novel method for displaying projected weather for navigation.

An aspect of exemplary embodiments of the present invention is to provide a novel method for displaying projected weather which provides individualized and location specific weather projection based on up-to-date weather forecasts.

An aspect of exemplary embodiments of the present invention is to provide users with weather information on wireless electronic devices (for example, a personal digital assistant, a mobile telephone, pager, navigator or any computing device).

An exemplary embodiment of the present invention provides a method for outputting weather information for navigating a vehicle comprising receiving geographic region information for a region specified by a user, presenting the geographic region in a graphical user interface, receiving at least one of past, present and forecasted weather data for the geographic region, storing received weather data, receiving a geographical route data for navigating a vehicle from the user, storing the route data, obtaining criteria for calculating projected weather data projected on the route, calculating said projected weather data for points along the route at a specified applicable time for a point, storing projected weather data and outputting said projected weather data comprising at least one of past, present and forecasted weather data, to the user.

An exemplary embodiment of the present invention provides method for providing individualized, location specific weather information for navigating a vehicle, the method comprising receiving a request from a user for said weather information, determining user's current location and time, determining user's route, receiving weather data for the route, calculating projected weather information for the route based on the received weather data, and presenting the projected weather information for the route, to the user for an applicable time for each point on the route.

An aspect of exemplary embodiments of the present invention is to provide a computer readable medium having stored thereon executable instructions for a method for displaying information, the method comprising instructions for receiving geographic region information for a region specified by a user, instructions for presenting the geographic region in a graphical user interface, instructions for receiving at least one of past, present and forecasted weather data for the geographic region, instructions for storing received weather data, instructions for receiving a geographical route data for navigating a vehicle from the user, instructions for storing the route data, instructions for obtaining criteria for calculating projected weather data projected on the route, instructions for calculating said projected weather data for points along the route at a specified applicable time for a point, instructions for storing projected weather data, and instructions for outputting said projected weather data comprising at least one of past, present and forecasted weather data, to the user.

An aspect of exemplary embodiments of the present invention is to provide a method for calculating projected weather data for each point along the route at a given time comprising receiving past, present and forecasted weather data, applying said weather data and timing data to a geographical route data for calculating projected weather data, and outputting weather data, wherein weather data comprises at least one of past, present, forecasted and projected weather.

An aspect of exemplary embodiments of the present invention is to provide a method for outputting weather information comprising receiving geographic region information, wherein geographic region information comprises at least a map, displaying the geographic region information in a geographic of a graphical user interface, receiving geographic route data, displaying the route data on the map in the geographic region, receiving weather data, wherein weather data comprises at least one of past, present, forecasted and projected weather data, and displaying weather data in at least one of tabular, geographic, graphical, textual and vector formats comprised in a weather data display, wherein the weather data display is at least one of displayed on a layer superimposed over the geographic region display and displayed separately from the geographic region display.

An aspect of exemplary embodiments of the present invention is to provide a method for outputting weather information, the method comprising receiving geographic region information, wherein geographic region information comprises at least a map, displaying said geographic region information in a geographic region display, receiving geographic route data, displaying route data in the geographic region display, receiving data selection information comprising at least one of geographical position coordinates, time and route waypoint for allowing user to display weather data for at least one of selected points and times along a route, receiving weather data relating to the received data selection information, displaying weather data in at least one of tabular, geographic, graphical, textual and vector formats comprised in a weather data display, for selected points and times along the route, highlighting, simultaneous to displaying weather data, weather data on the route in the geographic region display, wherein the weather data display is at least one of displayed on a layer superimposed over the geographic region display and displayed separately from the geographic region display.

An aspect of exemplary embodiments of the present invention is to provide a computer readable medium having executable instructions for calculating projected weather data comprising receiving past, present and forecasted weather data, applying said weather data and timing data to a geographical route data for calculating projected weather data, and outputting weather data, wherein weather data comprises at least one of past, present, forecasted and projected weather.

An aspect of exemplary embodiments of the present invention is to provide an apparatus for outputting weather information, the apparatus comprising a transceiving unit for receiving and sending data, wherein the transceiving unit comprises receiving geographic region information, wherein geographic region information comprises at least a map, receiving geographic route data, and receiving weather data, wherein weather data comprises at least one of past, present, forecasted and projected weather data; and a display unit for outputting weather information, wherein the display unit comprises displaying the geographic region information in a geographic region display of a graphical user interface, displaying the route data on the map in the geographic region display, and displaying weather data in at least one of tabular, geographic, graphical, textual and vector formats comprised in a weather data display wherein the weather data display is at least one of displayed on a layer superimposed over the geographic region display and displayed separately from the geographic region display.

An aspect of exemplary embodiments of the present invention is to provide an apparatus for outputting weather information, the apparatus comprising a transceiving unit for receiving and sending data, wherein the transceiving unit comprises receiving geographic region information, wherein geographic region information comprises at least a map, receiving geographic route data, receiving data selection information from a user, wherein data selection comprises at least one of geographical position coordinates, time and route waypoint for allowing user to display weather data for at least one of selected geographical position coordinates, times and route waypoints along a route, and receiving weather data relating to the received data selection information, and a display unit for displaying weather information, wherein the display unit comprises displaying said geographic region information in a geographic region display, displaying route data in the geographic region display, displaying weather data in at least one of tabular, geographic, graphical, textual and vector formats comprised in a weather data display, for selected points and times along the route, and highlighting, simultaneous to displaying weather data, retrieved stored weather data on the route in the geographic region display, wherein the weather data display is at least one of displayed on a layer superimposed over the geographic region display and displayed separately from the geographic region display.

Objects, advantages and salient features of the invention will become apparent to those skilled in the art from the following detailed description, which, taken in conjunction with annexed drawings, discloses exemplary embodiments of the invention.

BRIEF DESCRIPTION OF THE DRAWINGS

The above and other exemplary features and advantages of certain exemplary embodiments of the present invention will become more apparent from the following description of certain exemplary embodiments thereof when taken in conjunction with the accompanying drawings in which.

Throughout the drawings, like reference numerals will be understood to refer to like elements, features and structures.

DETAILED DESCRIPTION OF EXEMPLARY EMBODIMENTS

The matters exemplified in this description are provided to assist in a comprehensive understanding of exemplary embodiments of the invention of the present disclosed with reference to the accompanying figures. Accordingly, those of ordinary skill in the art will recognize that various changes and modifications of the exemplary embodiments described herein can be made without departing from the scope and spirit of the claimed invention. Also, descriptions of well-known functions and constructions are omitted for clarity and conciseness.

The method and apparatus for providing an integrated weather display and travel and navigation decision system allows a user to easily see projected weather conditions, on the display of a computing device, for a proposed travel route.

Figure 9:
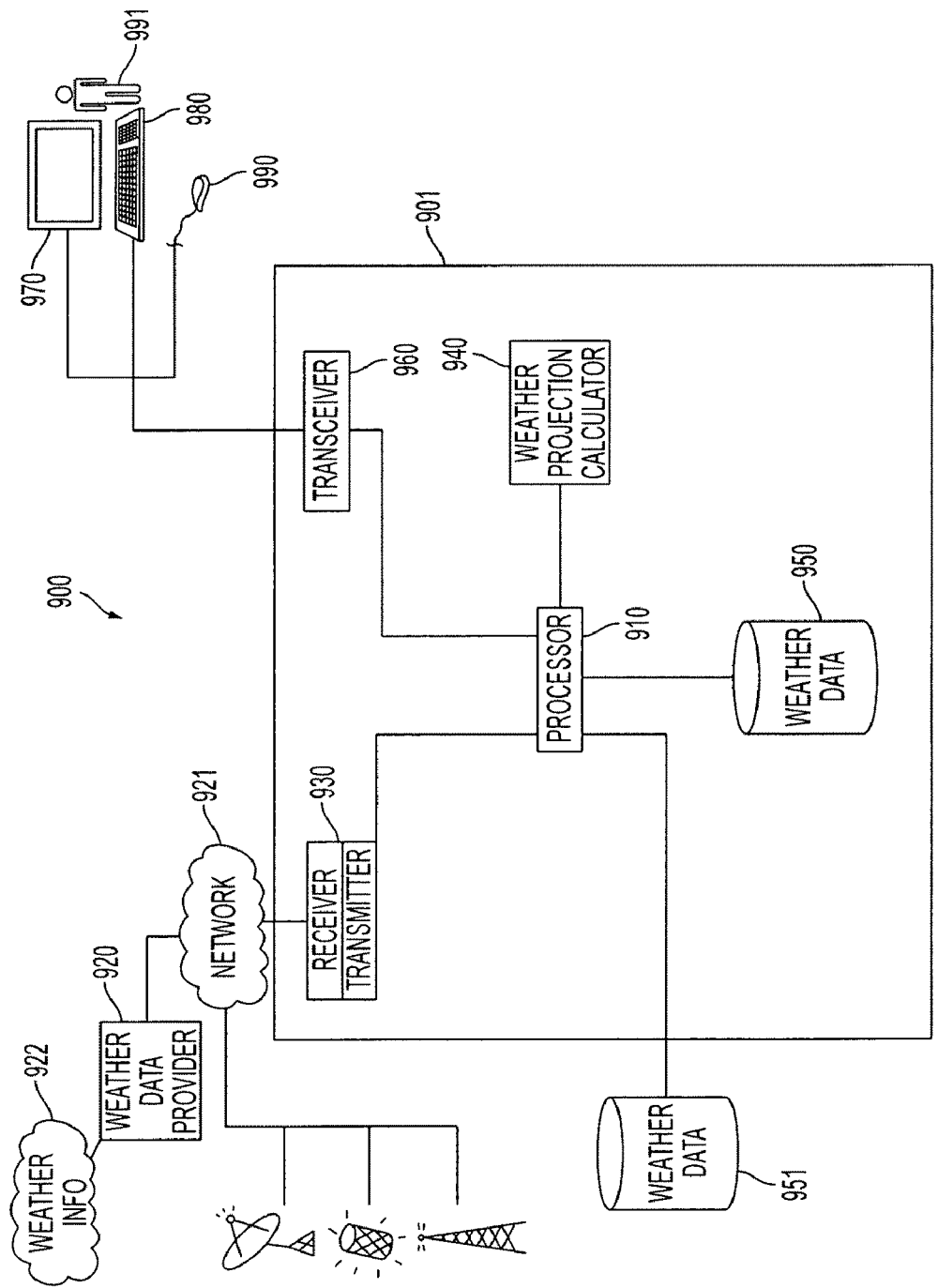
FIG. 9 illustrates a block diagram showing the primary components of the integrated weather and travel and navigation decision, according to exemplary embodiments of the present invention.

FIG. 9 illustrates a block diagram showing the primary components of the integrated weather and travel and navigation decision system, according to exemplary embodiments of the present invention.

Figure 1:
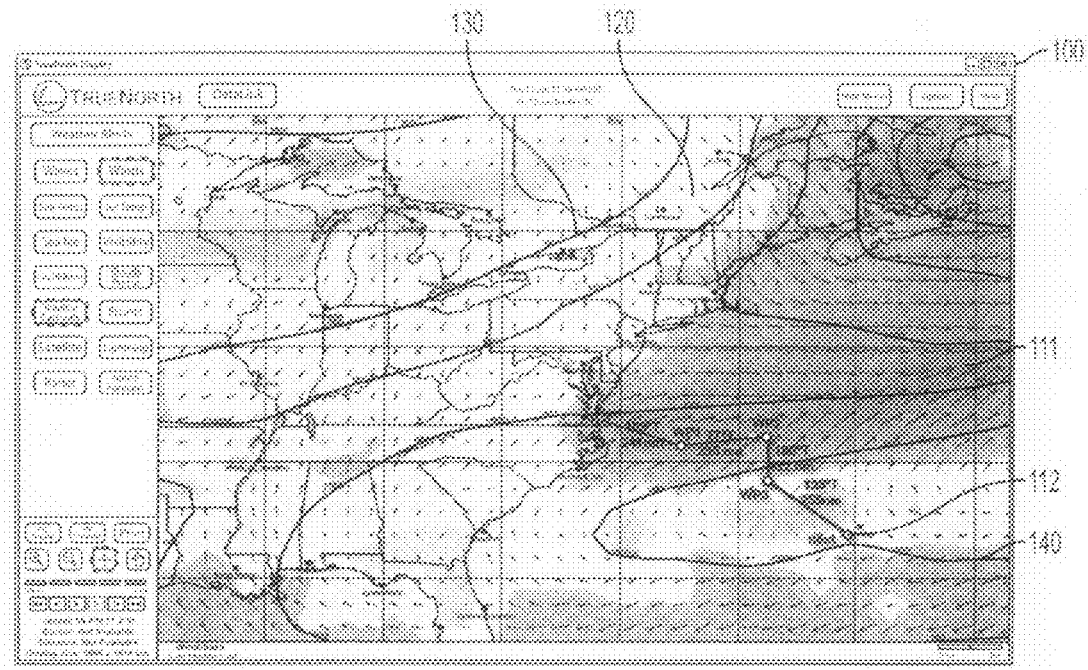
FIG. 1 shows a weather data array file overlaying a map illustrating winds and barometric pressure for a region on the earth in accordance with an exemplary embodiment of the present invention.
Figure 2:
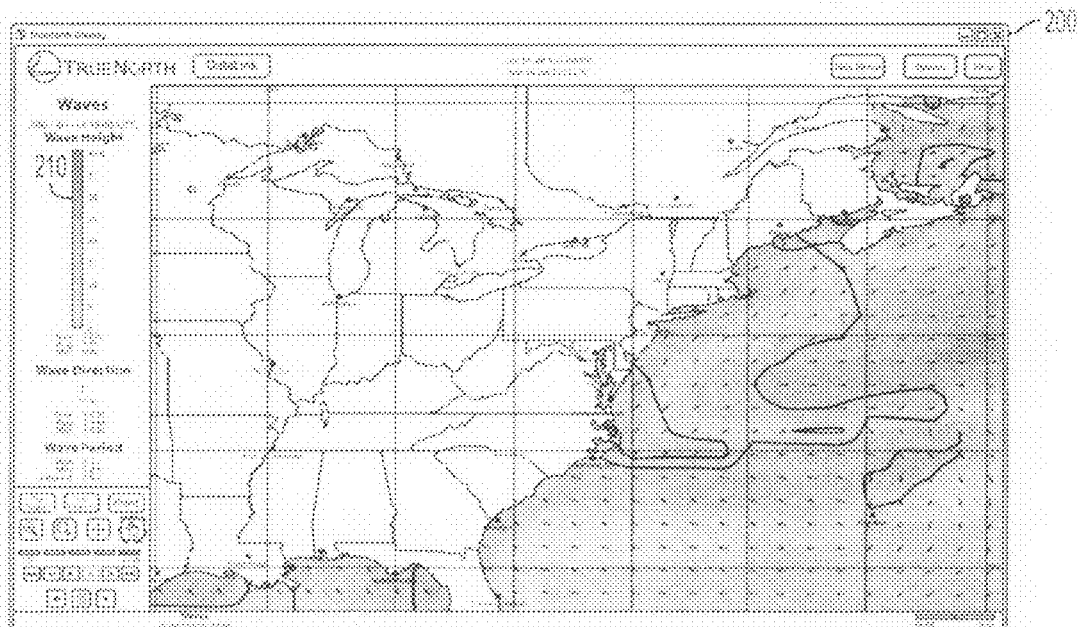
FIG. 2 shows charts similar to FIG. 1 for showing wave height, direction, and period in accordance with an exemplary embodiment of the present invention.
Figure 3:
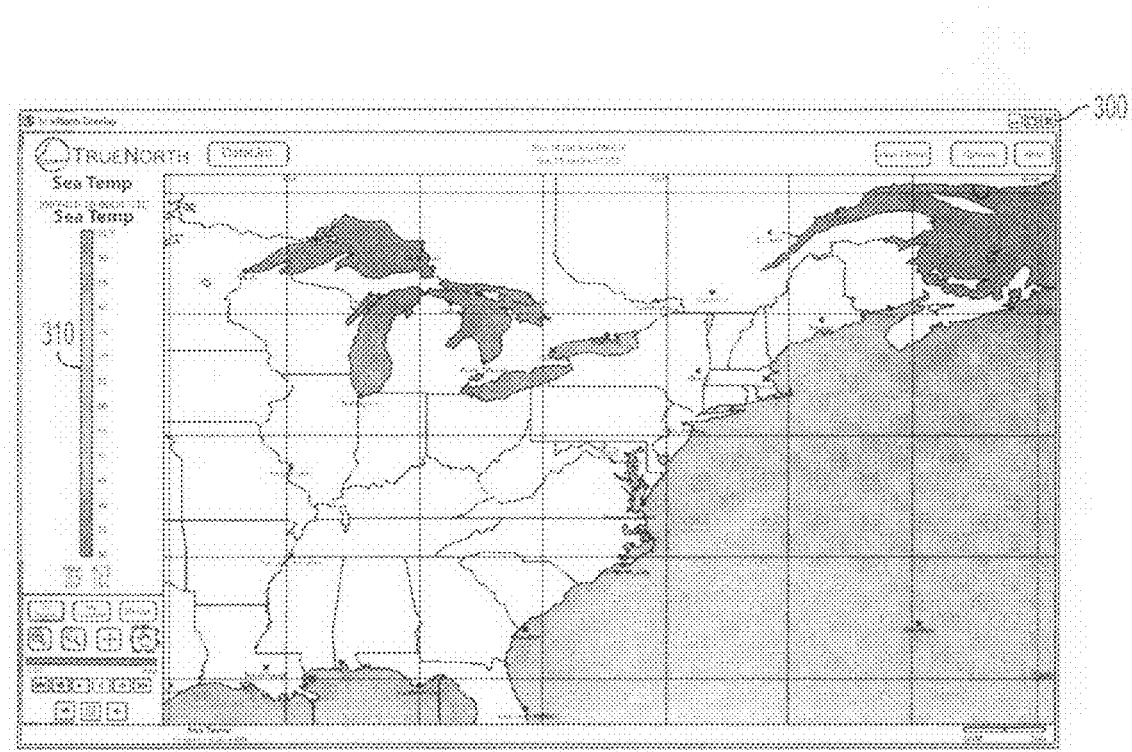
FIG. 3 shows a chart with sea surface temperature for the same area depicted in FIGS. 1 and 2 in accordance with an exemplary embodiment of the present invention.

FIG. 1 shows a weather data (100) array file overlaying a map (120) illustrating winds (130) and barometric pressure (140) for a region on the earth. For purposes of illustration, typical marine applications shall be described herein in accordance with an exemplary embodiment of the present invention. Similar applications for aircraft pilots and potentially other mobile users or vessel operators, however, are possible. This information is shown using one of several available weather data array viewing packages. In FIG. 1, a proposed vessel route (110) overlays the weather information (130, 140), showing an example route from the Chesapeake Bay to Bermuda; however, the present invention also can apply to any route on the earth. FIG. 2 shows similar charts (200) showing wave height (210), direction (210), and period (210), while FIG. 3 shows similar charts (300) showing sea surface temperature (310) for the same area. Similar data is also available for wind, wave height, wave direction, wave period, swells, sea currents, sea surface temperatures, air temperature, visibility, precipitation, cloud cover, sea ice, atmospheric vorticity, 500 mile contours, fronts, lightning, cyclones, hurricanes, tornadoes and other weather, surrounding and environmental conditions.

In accordance with an exemplary embodiment of the present invention, a processing device (for example, a portable computing device such as a laptop computer) (901) with a display (970) can be programmed via software to receive user inputs (such as at least one of a keyboard (980) and mouse (990)), the above-described data files, vessel instrument readings, among other data, and to process these inputs and data to generate improved displayed data such as conditions along a planned vessel route or other readily understandable representation of how weather, currents and other forecast conditions will affect the vessel at any given point in time for the duration of the weather forecast period or time remaining to traverse the planned route. The computing device (901) can be provided with network connection (921) comprising at least one of a wireless and wired connection to receive data via the internet or other communication network. A vehicle may comprise any mobile computing device with communication capabilities.

According to an exemplary embodiment, the decision system provides a method and apparatus for providing integrated weather display and travel and navigation decision system. The decision system comprises control logic (for example, computer software executed by a processor (910), to perform the functions of a presenting weather data to users.

By way of example in FIG. 1, a mariner identifies his proposed route by superimposing points describing the route on a chart (110) using his portable computing device (901). In this example, the route includes a total of five points describing it, although any number of points is possible using this technique. The five points included in this example are a start point (111), three intermediate waypoints, and a destination point (112). The route can also be described using a data file that the mariner or vessel operator creates describing the geographic coordinates of each point defining the route or using a file obtained from other sources such as navigation software or external sources (e.g. vessel navigation, airplane flying or fleet management) using a data connection to the portable computing device. The route information can also optionally include departure or arrival times, and layover times at any point.

Figure 4:
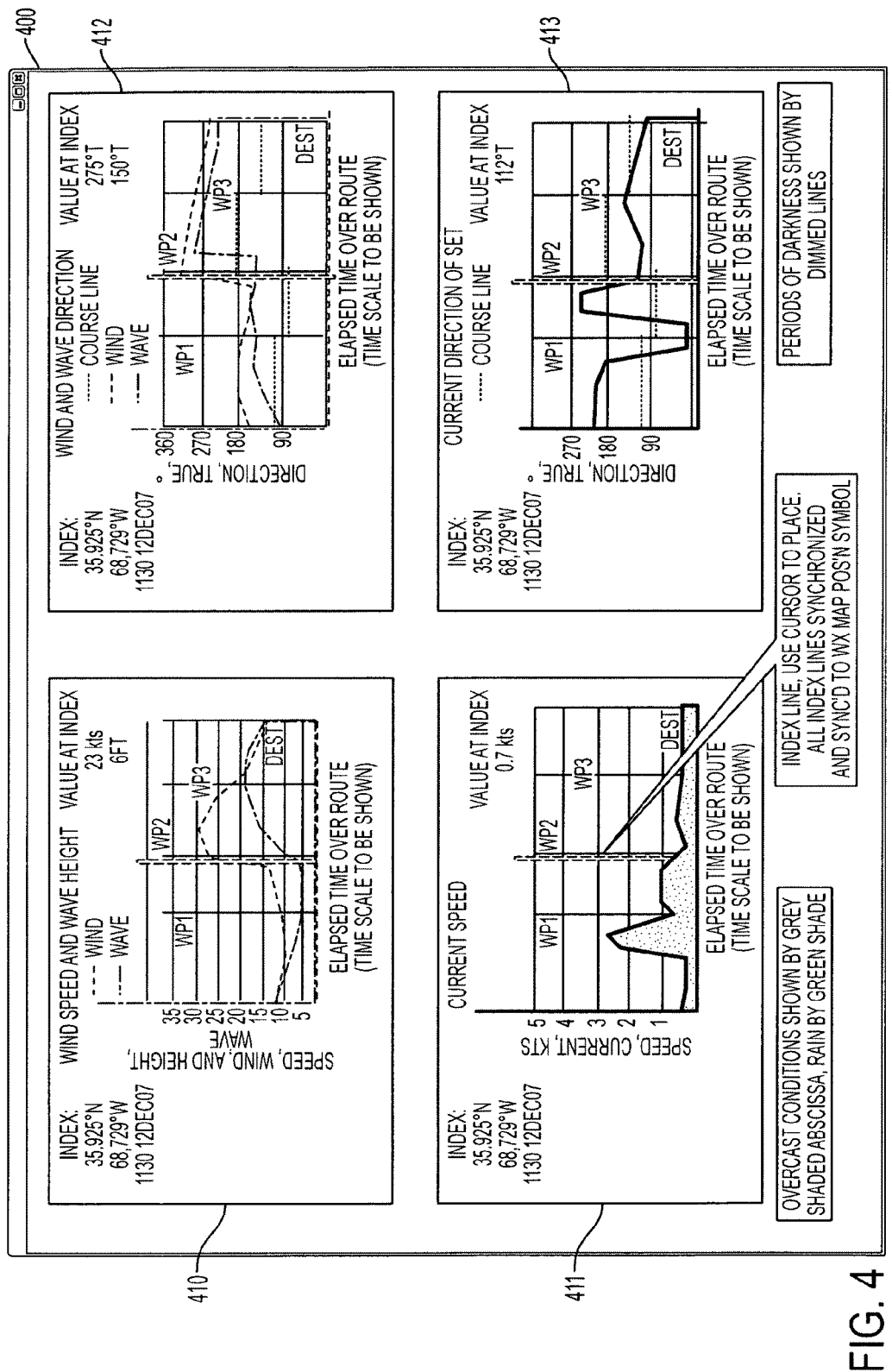
FIG. 4 depicts graphs presenting values of different items of weather information selected by a vessel operator for each point along a proposed route as seen at the anticipated vessel arrival time at such a point given its expected speed of advance on the route, including any delays at waypoints, in accordance with an exemplary embodiment of the present invention.

From the route data, the departure time data, and knowledge of the vessel's speed of advance over the route (e.g., obtained either from direct entry by the user, automatic entry from instruments, or calculated or predicted from vessel performance data and route weather condition data), the onboard software calculates and displays graphs (410, 411, 412, 413) such as those displayed in FIG. 4. These graphs present the values of each item of weather information selected by the mariner for each point along the route as seen at the anticipated vessel arrival time at such a point given its expected speed of advance on the route, including any delays at waypoints.

According to an exemplary of the invention, the processing system obtains a route over a geographic area to be followed by a vehicle (for example, a vessel) from a source (for example, at least one of user input, stored and received file). The route includes a start point together with a scheduled start time and date on the route, designated waypoint locations for route segments in straight lines from the previous point, being either a waypoint or the start point, and including events at the waypoints, wherein events comprise at least one of a specified duration and/or changes in course, speed, or equipment, settings and handling or other things that may affect vessel behavior. The last waypoint of a route can be taken as the end point of the route. Route data comprises a navigation route, together with schedules, delays associated with the defined route, information affecting each start point, waypoint, endpoint of the route, and other factors affecting vessel performance along each segment of the route.

Additionally, the processing system obtains applicable conditions comprising at least one of weather and/or sea conditions within the geographic area encompassing the route and encompassing the time period during which the vehicle (for example, vessel) traverses the route. This weather information comprises at least one of weather and sea conditions for each of a plurality of geographic points times over an area in which the route is located, each one of which is given for one or more times during which the route is/was in use by the vehicle (for example, vessel).

Additionally, the processing system can be adapted to obtain information on how the vessel behaves given specific weather conditions comprising at least one of wind speed, wind direction, wave period and direction, and given other conditions, such as engine power for each engine, sails deployed, trim conditions and similar factors. The processing system can be adopted to consult preferences or limits on vessel response and desired or expected alternative behavior if limits are exceeded.

According to exemplary embodiments, an external source (for example, a user, mariner or pilot), supplies or the processing system chooses at least one or more step sizes of any convenient size (for example, a quantity of miles, minutes, seconds, meters or other convenient measure) in time or distance along the route to be used as intervals between successive condition and vessel behavior evaluations on the route.

According to an exemplary embodiment, the processing system interpolates as necessary (for example, in as many as two dimensions (or three dimensions for aircraft)) in space between geographic points for which weather is available and interpolates between the times before and after departure for which weather data is available to arrive at estimated weather conditions for the departure location and departure time. The processor then consults route data to obtain the direction of advance, and applies weather and direction data to vessel response, condition, setting and handling data to determine the expected vessel response to the weather and sea conditions for the departure place and time. This response data is used to project the movement of the vessel along the route, or if conditions prevent the vessel from proceeding in the desired direction, projects the movement along a path consistent with known alternative vessel behavior. This projection is continued in space or time until the step size is achieved in distance or time traveled. The vessel location and arrival time at this new geographic point is then used to repeat the process described here to project the movement of the vessel along the next step or interval in distance or time along the route. This process continues for each step along the route until the route is completed, taking into account delays, changes in direction, and changes in vessel conditions or responses occurring at each waypoint.

According to exemplary embodiments of the invention, the process described above results in a library of data, the description comprising at least one of weather, sea, and vessel response (for example, vessel speed, heel, roll response, discomfort index) conditions for each step along the route. The processor may iterate this process to move the point for which conditions are calculated to another point within the calculated step, such as the center of the step.

The processor performs calculations from this data comprising at least one of 1) correcting wind speed and true direction and wave period and true direction by the true current direction and speed at the location to find the observed wind and wave conditions relative to a vessel at rest in the water; 2) determining vessel performance in terms of heading to stay on route, speed, and heel from the desired course and weather and sea conditions, vessel response data, and vessel settings, handling, and condition, iterating if necessary to find the necessary true heading (angle of the bow relative to true North) necessary to stay on route and the resulting speed; 3) determine anticipated vessel speed and direction through the water and over the ground; 4) Vessel side slip if any under the above conditions and subsequent corrections to heading, iterating if necessary; 5) vessel magnetic heading from known magnetic variation (difference between the direction to the magnetic north pole and the true north pole) by adding West deviation or subtracting east deviation to true heading to get magnetic heading, and 6) applying compass deviation (reading error) to the magnetic course to get compass course to stay on route. This data is stored or made available at least for each step on the route, creating a library of data for conditions for all steps for which the process is desired.

Additionally, the library of data can then be manipulated by the processing system to show data of direct relevance to the vessel, as for example by expressing it in the vessel's display of spatial reference. For example, by subtracting the true vessel speed and current vector relative to the ground from the true wind speed and direction, and correcting for the difference between vessel course and vessel heading, to get wind speed and direction relative to the vessel display of reference. The same may be done for wave direction and period to get wave direction and period relative to the vessel. This data is used with vessel response data to calculate vessel roll rates and amplitudes, pitch rates and amplitudes, all from relative wind and wave conditions, and, by combining wave period calculated here and supplied wave amplitudes, and optionally heel and roll amplitudes and rates, a discomfort factor as described earlier.

According to an exemplary embodiment of the present invention, this data is recorded for each step on the route, substituting geographic points and times within each respective step for the departure points used above, and forms a second library of vessel-relative data.

According to an exemplary embodiment, the processor and display systems then generate vector diagrams for each step on the route on request or in advance, and generates other plots of this data in forms in which the data can be read easily by the navigator on board the vessel. This data notable comprises data describing at least one of wind, waves, vessel motion, vessel performance, and other factors relative to the display of reference in which a person on the vessel would experience them, that is, relative to the vessel display of reference (see FIGS. 6, 7 and 8). The processor may automatically generate vector diagrams for any point a user designates by inputting coordinates which the processor uses to find conditions for the nearest step on the route to display, or by the user indicating on a graphic display with a form of cursor the step or position along a route for which the information is to be displayed. According to an exemplary embodiment of the present invention, a user of the system, can also generate other ways of presenting this relative data for point(s) along the route, as for example by using a 3-dimensional graphic display where necessary, or by keying certain data to colors, line widths, or other graphic factors in a display.

Figure 8:
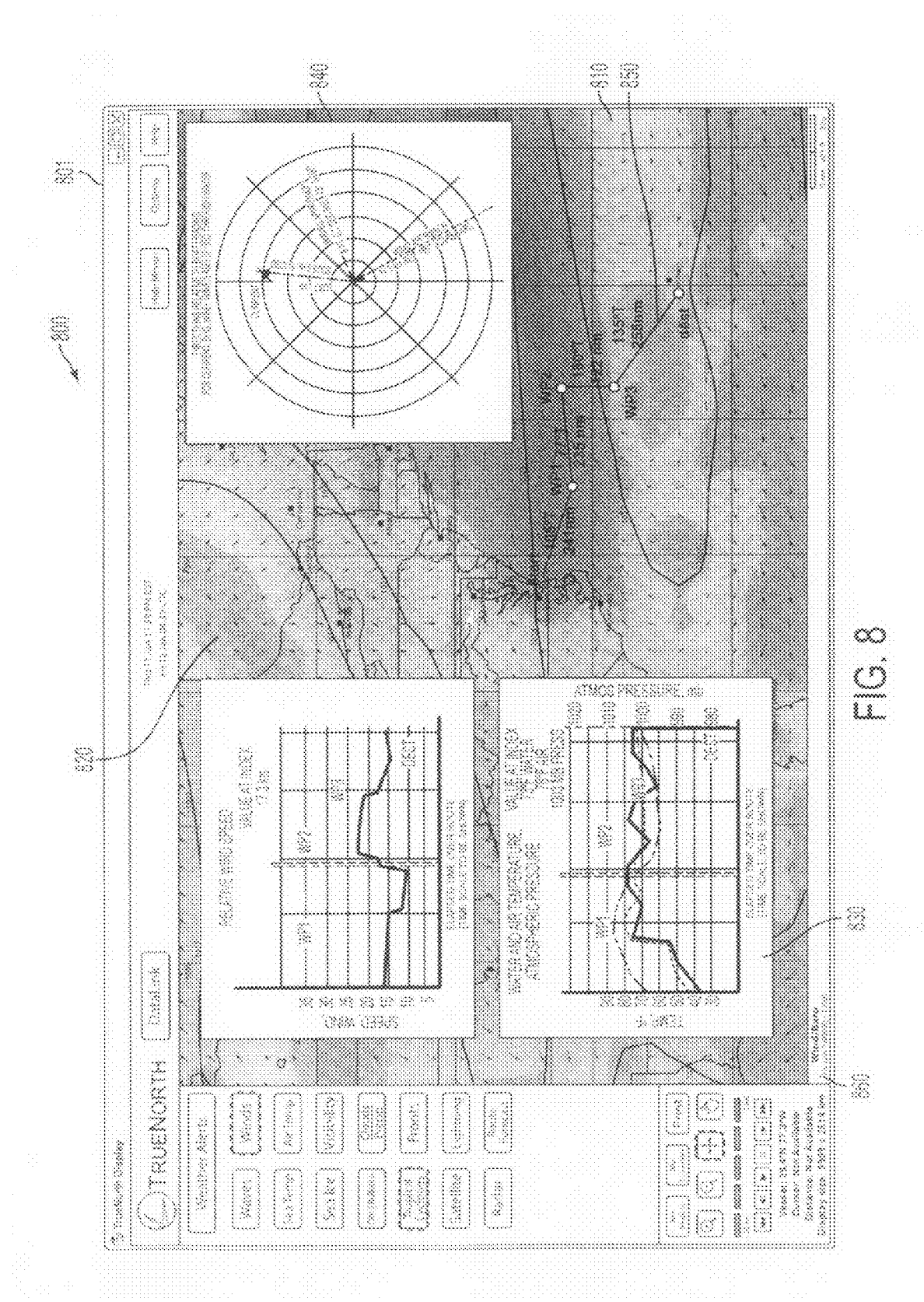
FIG. 8 illustrates an integrated display providing both a weather information display and decision system that incorporates weather depiction charts together with the graphs and diagrams as an integrated to aid safe and comfortable vessel navigation and handling, furnishing data of immediate comprehension and use to the vessel operator including data presented from his perspective and using his display of reference in accordance with an exemplary embodiment of the present invention.

According to exemplary embodiments, FIG. 8 shows a method for outputting weather information (800) comprising receiving geographic region information, wherein geographic region information comprises at least a map (820), displaying the geographic region information in a geographic display (810) of a graphical user interface (801) receiving geographic route data, displaying the route data on the map in the geographic display (850), receiving weather data, wherein weather data comprises at least one of past, present, forecasted and projected weather data, and displaying weather data in at least one of tabular, geographic, graphical, textual and vector formats comprised in a weather data display (830, 840), wherein the weather data display is at least one of displayed on a layer superimposed over the geographic region display (830, 840) and displayed separately from the geographic region display (600, 700).

Figure 6:
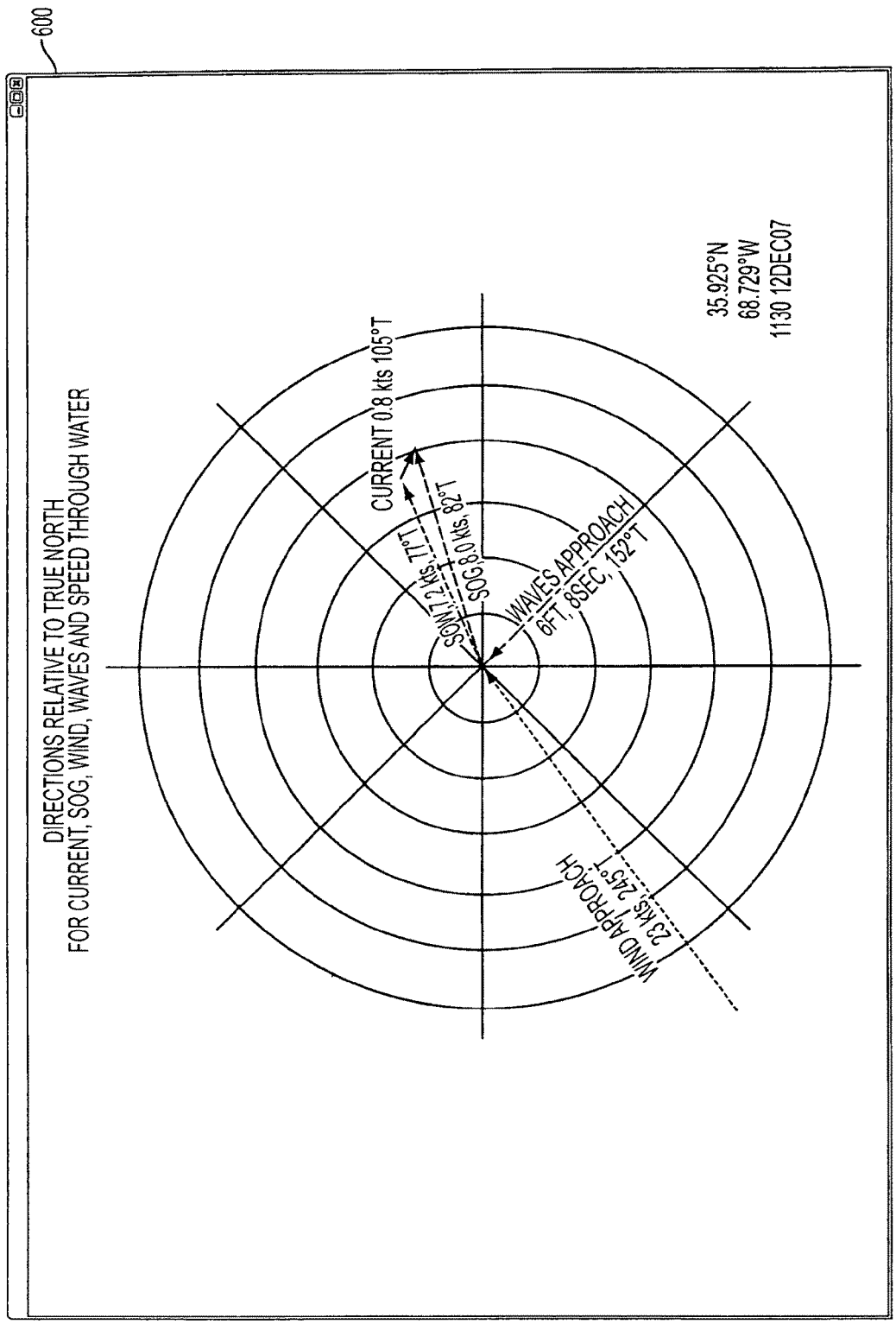
FIG. 6 illustrates a display for deriving data from data array files such as GRIB or wxml files, presenting such data for any selected point on a route or any other point where a vessel may be, and showing the values for any selected weather item expressible as a vector for any point on the route in polar coordinates relative to a geographic reference such as true or magnetic North in accordance with an exemplary embodiment of the present invention.
Figure 7:
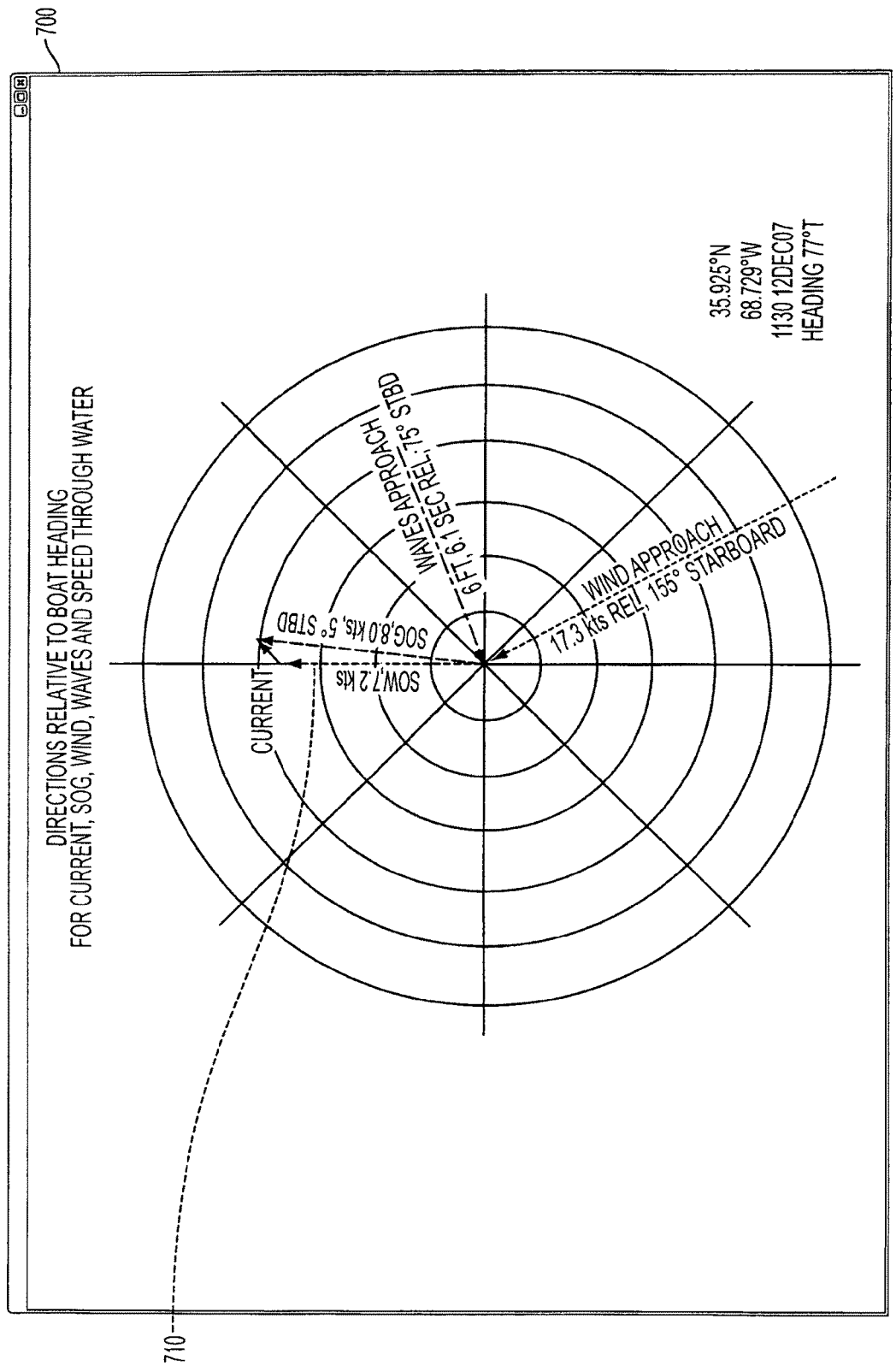
FIG. 7 illustrates a display for deriving data from data array files such as GRIB or wxml files, presenting such data for any point on a route or any other point where a vessel may be, and showing the values for any selected weather item expressible as a vector for any point on the route in polar coordinates by angle relative to a vessel direction reference, such as relative to vessel heading or the direction in which the bow points in accordance with an exemplary embodiment of the present invention.

Additionally, displaying weather data in a vector format comprises displaying weather data selected as a vector for any point on the route in polar coordinates relative to the geographic region, as shown in FIGS. 6, 7 and 8, wherein the geographic reference comprises one of true north, magnetic north, a fixed vehicle position, a moving vehicle position, a fixed point and any reference selected by user (600, 700, 840). Furthermore, displaying weather data in a vector format comprises one or more of displaying vector sum or difference plots whose resultant vector originates at the route point the user is interrogating on the route applicable to a time a vehicle would be at that point, and displaying weather data in reference to true or magnetic north coordinates, referenced to vessel coordinates, referenced to the desired track for any route point of the route the user references for the time the vehicle is projected to be at that point, wherein weather data can be derived from data array files. Furthermore, displaying weather data comprises displaying vector summation of one or more of compass heading, wind speed, wind direction, vessel speed through the water, currents of any type, anticipated sideslip, magnetic variation, compass deviation and/or any other effects on vessel speed and direction, for yielding a resultant forecasted vector of motion in the geographic reference display applicable to the weather data, route display and/or route definition.

Figure 5:
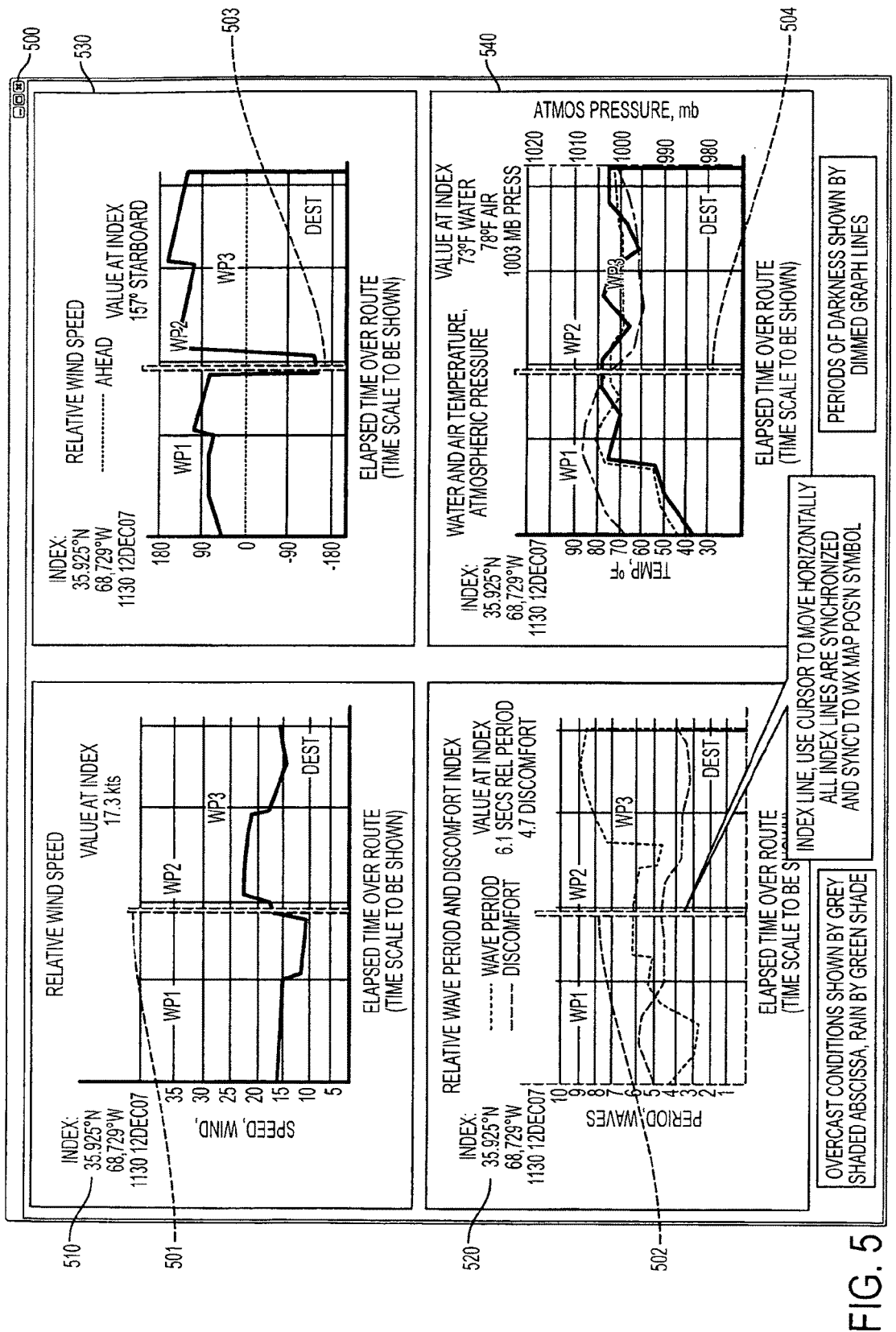
FIG. 5 shows graphs presenting a display for deriving data values from data array files that presents anticipated weather data to be encountered over a route, showing the values for any selected weather item for each point on the route referenced to a direction on the vessel (such as angle to starboard or port of the vessel ahead direction) and arrival time at the point, rather than to geographic orientation references such as angle relative to true North or magnetic North, in accordance with an exemplary embodiment of the present invention.

According to an exemplary embodiment of the present invention, FIG. 5 shows a novel system for deriving data values from data array files that presents anticipated weather data to be encountered over a route (510, 520, 530, 540), showing the values for any selected weather item for each point on the route referenced to a direction on the vessel (such as angle to starboard or port of the vessel ahead direction) and arrival time at the point, rather than to geographic orientation references such as angle relative to true North or magnetic North.

The decision system calculates wind speed (510) and direction (530), wave direction, period (520) and speed, and current speed and direction relative to the vessel as it moves through the water. Typically, the vessel's motion will change the values for this data, both in direction and magnitude, compared to weather data measured at the same point for an object fixed at that point. One of the unique characteristics of embodiments of the present invention is the combination of generic weather information with the vessel's orientation and planned route to create an instantly understandable representation of how the weather, currents, and other forecast conditions will affect the vessel at any given point in time for the duration of the weather forecast period or the time remaining in the voyage.

This decision system also calculates a novel parameter termed "Discomfort Index" that corresponds to the wave height divided by wave period as seen by a moving vessel (520). This index may also be modified by a factor proportional to average angle of heel and/or average roll and/or average roll amplitude. This index increases as vessel motion due to waves becomes quicker and/or larger in amplitude, and is a convenient means for evaluating the relative comfort of various positions or routes given the wave conditions at such positions or on such routes.

The plots described above show conditions all along the route for those times at each point on the route when the vessel is expected to arrive there. The vertical yellow line (501, 502, 503, 504) is a highlight line at which values are cited in a legend (860). Data presented in the figures may also be referenced to the position of the yellow lines in the charts.

The above charts are representative and can also include presentation of other data in addition to or replacing the data types shown. Other calculated parameters similar in concept to the "Discomfort Index" can be envisioned for other users based on combination of the available weather or other transmitted information, vessel or aircraft performance parameters, and stored information.

In accordance with another exemplary embodiment of the present invention, a novel system is provided for deriving data from data array files such as GRIB or wxml files, presenting such data for any selected point on a route or any other point where a vessel may be, and showing the values for any selected weather item expressible as a vector for any point on the route in polar coordinates relative to a geographic reference such as true or magnetic North. FIG. 6 illustrates such a display. The values presented for the point or location in question are those expected or experienced at the time shown, usually but not necessarily taken as the time the vessel is expected or was at that point. Here, such vector-oriented weather data for the relevant point is derived by the on-board software from the available weather data array files using interpolation. The polar graph is calibrated to show some geographic reference direction as its primary direction reference, such as by showing the up direction as true North. Further, the polar graph displays uses the vector for current (i.e., movement of the mass of water in which the vessel operates) at the point of interest derived from the applicable data array to show how the vessel's speed over the water (SOW) is modified by the current vector for the speed of the water itself to result in a vector for the vessel's speed over the ground (SOG). This is done by showing the SOW vector originating from the polar graph's origin and pointing in the direction of the vessel's heading relative to the geographic reference chosen for the polar diagram. The current vector is appended to the head of the vessel's SOW vector and points in the direction of the current for the point in question relative to the same geographic reference direction. The SOG vector is the resultant vector from the sum of the SOW and current vectors, originating from the polar diagram origin and pointing to the tip of the current vector. Speed and direction values are presented relative to an object fixed (motionless) at the geographic point of interest.

Vectors for wind and for waves are shown pointing in the direction of flow with the heads of the vectors at the diagram origin and the length of the vector representing wind speed and wave height or period respectively. The direction of the vectors is referenced to the reference direction for the polar diagram.

In accordance with another exemplary embodiment of the present invention, a novel tool is provided for deriving data from data array files such as GRIB or wxml files, presenting such data for any point on a route or any other point where a vessel may be, and showing the values for any selected weather item expressible as a vector for any point on the route in polar coordinates by angle relative to a vessel direction reference, such as relative to vessel heading or the direction in which the bow points. FIG. 7 illustrates such a presentation. The values presented for the point or location in question are those expected or experienced at the time shown, usually but not necessarily taken as the time the vessel is expected or was at such point. All of the above-described vectors are displayed in like manner as in the polar diagram shown in FIG. 7, but with angles or directions relative to the vessel coordinate system rather than the geographic coordinate system used earlier (710). The directions and magnitudes of the vectors are also calculated via the processor (910) of the computing device by taking into account the vessel's own movement, so that the magnitudes and directions are measured and displayed relative to the moving vessel. This format for deriving data from data array files and presenting it to the mariner gives the mariner data that is directly related to what the vessel itself is experiencing, and therefore aids him immediately in determining how to navigate and handle the vessel. For example, forward motion of the vessel may increase the speed magnitude of a wind coming from an angle ahead of the vessel by the vector addition to it of the speed of the vessel's own advance, and will make the wind seem stronger and from closer ahead than it would appear if the vessel were not moving. This increased "apparent" wind speed value and closer angle may affect the mariner's decisions on route, comfort, or boat handling, when compared to values shown on weather charts. The same is true for current and waves. Mariners are skilled in this conversion, but until now must do it themselves from geo-referenced weather reports.

Exemplary embodiments of the present invention provide a weather information display and decision aid that incorporates weather depiction charts together with the graphs and diagrams described above as an integrated system to aid safe and comfortable boat navigation and handling, furnishing data of immediate comprehension and use to the mariner including data presented from his perspective and using his display of reference. FIG. 8 illustrates an example of such an integrated display.

The embodiments of a weather information display system presented here may also apply to land-based and aviation applications for deriving and presenting weather data that is immediately useful to the driver, pilot, or navigator for optimizing weather comprehension, routing, and route timing.

Existing products are able to record and display weather as seen by the vessel, including weather data over a displayed area and time plots of various parameters experienced by the boat, such as boat speed through the water and over the ground, true and relative wind speeds, and true and relative wind angles. They are also capable of importing weather data array files (for example, GRIB, or similar, files), overlaying them on navigation charts, overlaying in turn a desired route, and calculating an optimum path from origin to destination given the projected weather. MaxSea and Deckman are examples of navigation software also performing these functions. The present invention is advantageous since, unlike these existing systems, it also derives and displays vessel movement, weather, and sea conditions from weather data array files and anticipated vessel performance for presentation by polar and rectangular vector plots showing the strengths and angles of those factors, including those both true (relative to true North or other geographic direction reference) and relative to the vessel.

According to an exemplary embodiment of the present invention, the weather data can be stored in a database (950) on the user's terminal and/or stored on a database that is external to the user's terminal (951). The weather data comprises past, current, forecasted and projected weather data. Past weather data comprises data for weather that has already occurred in the past relative to the time the data is examined. Current weather data comprises data for weather that is occurring approximately at the time of weather data examination (for example, a storm, tornado, hurricane and so on). Forecasted weather data comprises weather data that is forecasted to occur in the future relative to the time the data is examined, and which was calculated prior to being obtained by the decision system ore received by the receiver (930). Projected weather data is weather data that the decision system (900) calculates (940) for presenting to the user (970). The decision system can use data that is stored in the database (950, 951) and data is retrieved from another source but is not stored in the database (922).

According to exemplary embodiments, the decision system is responsive to received and/or stored weather data as a function of both location and time, which generates the projected weather data for the proposed route and/or the period of time.

Figure 10:
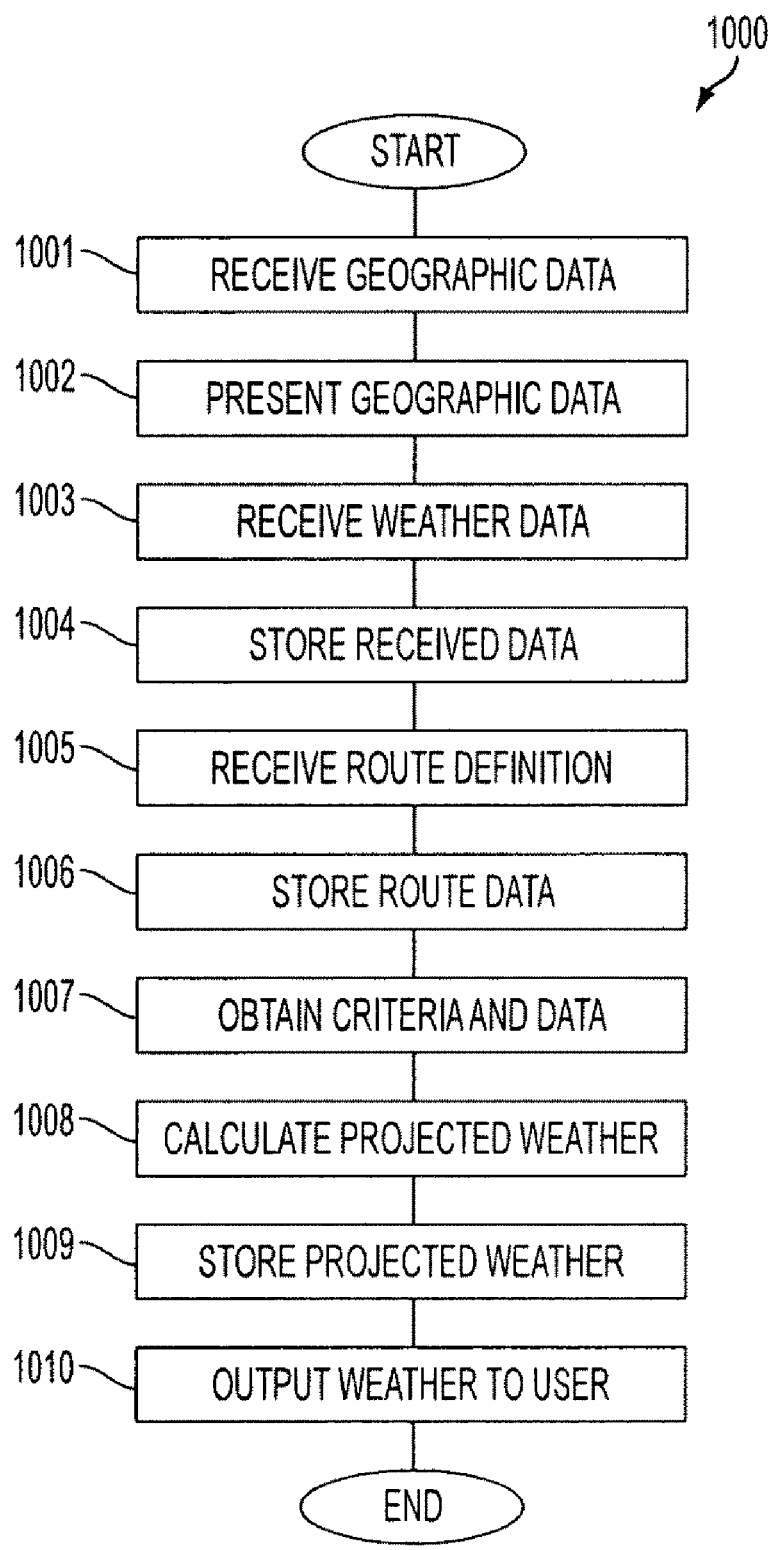
FIG. 10 illustrates a flow chart depicting the steps associated with the method of providing an integrated weather and travel and navigation decision according to an exemplary embodiment of the present invention.

According to an exemplary embodiment as shown in FIGS. 9 and 10, a user (991) can be provided weather data on a display (970) for navigating, using the decision system (900), according to the following process:

(1) A user (991), using the decision system (900), obtains geographic region information, weather description data, present and forecasted, for an area of operation in geo-referenced formats (1003). For example, winds, waves, swells, currents, temperatures and other geo-referenced formats.

(2) A user, using the decision system (900), defines a route of interest, geographically referenced in the decision system (1005). For example, the user defines waypoints, including start, turns, layovers, destination and arrival and departure times for each waypoint;

(3) A user, using the decision system (900), optionally defines exclusion criteria in the decision system (1007). For example, maximum winds, maximum waves, maximum swells, motion period and amplitude (roll, pitch).

(4) A user, using the decision system (900), optionally furnishes vessel performance data, such as polar diagrams for vessel performance given stated external conditions to the decision system (1007).

(5) The decision system (900) applies weather data to the route, timing data to calculate projected conditions for each point along the route (1008). Given that data on weather and sea conditions is for specific spatial and temporal points, the decision system interpolates, as necessary, in space and time to generate values for weather conditions, sea and any other desired conditions for each point along the route applicable to the time the vessel is projected to be at each such point for the whole route. The decision system stores (1009) and displays the projected weather and other conditions in geographic, graphical, textual and vector formats (as shown in FIGS. 4(400), 5(500), 6(600), 7(700) and 8(800))(see item 1010 of FIG. 10).

(6) The vector display (840) can show vector summations to the user (991). For example, compass heading, wind speed and direction, vessel speed through the water, currents of any type, including effects also resulting from anticipated sideslip, magnetic variation, compass deviation and/or any other effects on vessel speed and direction (see item 1008 of FIG. 10).

(7) The decision system (900) uses weather and sea condition data together with calculated resultant vessel movement to calculate relative sea or swell direction and speed, relative wind speed and direction, being relative to the vessel's coordinate system (speed relative to the vessel, angle relative to the vessel heading)(see item 1008 of FIG. 10).

(8) The decision system calculates other (e.g. scalar) values, such as discomfort index, vessel-felt sea period, or vessel-felt swell period, for each point along the route (see item 1008 of FIG. 10).

(9) The decision system (900) provides a user a choice to have the system calculate (940) and show any of the weather conditions/factors in a graphical vector format on a polar plot (as shown in FIGS. 6 and 7). The polar plot is designed to show the resultant derived vector output as a vector from the origin of its respective polar plot. Nonvector values such as discomfort index may be shown optionally as a vector with an arbitrary heading and a magnitude equal to its value, or as a numeric value using digits. This can be done for each point along the route using conditions applicable to the time of presence at each such point (1010).

(10) The decision system (900) can show results of calculating predicted weather as a vector diagram display (970) separate from the graphical geographic information. The vector diagrams can be referenced to true or magnetic coordinates (for example, North up), referenced to vessel coordinates (for example, relative to the bow or Heading up and shown relative to a vessel outline or diagram), or referenced to the desired track (for example, course up) for any route point of the route that the user references for the time period the vessel is projected to be at that point (1010).

(11) The decision system (9000 can also show output as a vector summation or difference plot, whose resultant vector originates at the route point the user is interrogating on the geographically-displayed projected route applicable to the time the vessel would be at that point, and shown in the coordinates reference system applicable to the geographic display in which the route is shown (1010).

(12) A user can access the displays by either clicking (for example, using a mouse pointer (990)) on a point on the route or on a plot of the timeline of the route (for example, distance traveled versus time) or by entering (for example, using a keyboard or text entry means (980)) position coordinates, time, route waypoint, or similar, thereby causing the software to call up the desired vector and scalar displays for that point and/or time shown in any manner the user selects, and simultaneously highlighting the applicable point on the route as shown on any or all points displaying the route, time or position, either graphically, on a geo-referenced plot or in tabular data.

Figure 11:
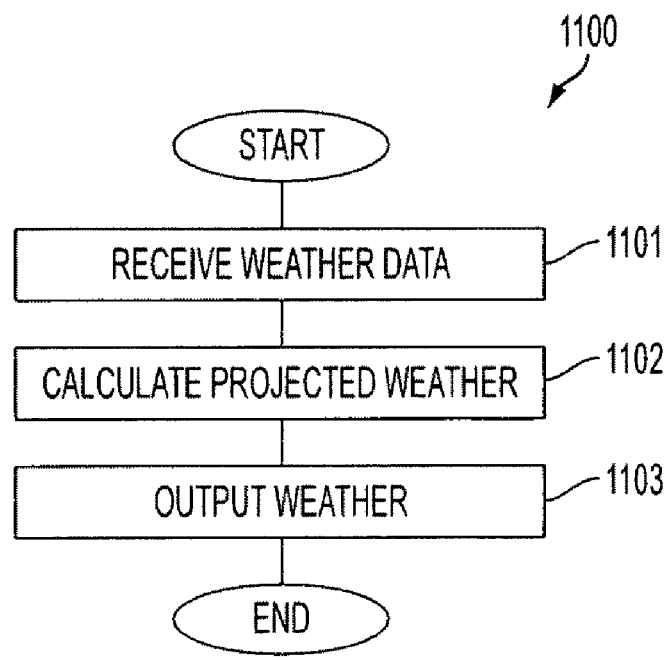
FIG. 11 illustrates a flow chart depicting the primary steps associated with calculating projected weather data for each point along the route according to an exemplary embodiment of the present invention.
Figure 12:
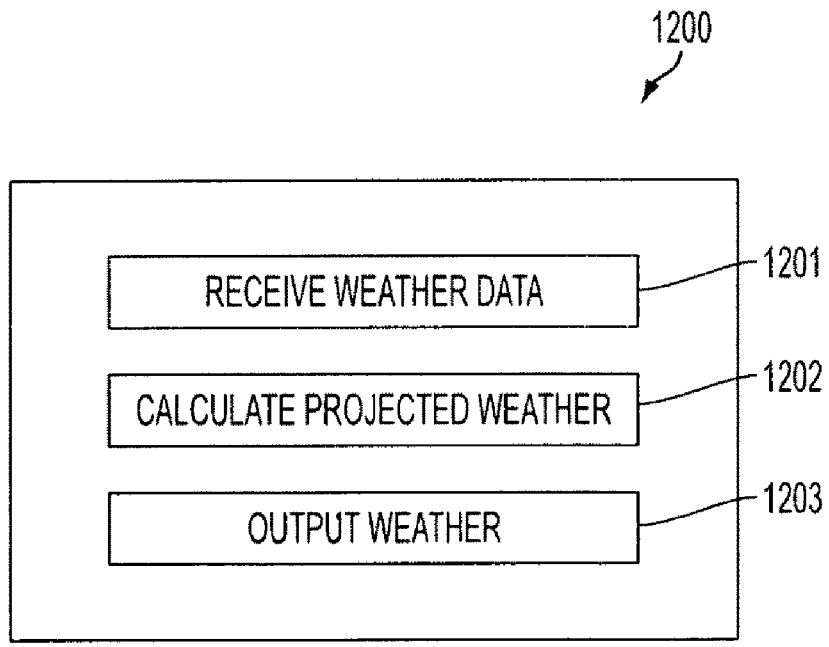
FIG. 12 illustrates a block diagram shows the primary components for calculating projected weather data for each point along the route at a given time according to an exemplary embodiment of the present invention.

FIGS. 11 and 12 illustrate exemplary embodiments of the present invention by showing a method for calculating projected weather data (1100) for each point along the route at a given time comprising receiving past, present and forecasted weather data (1101), applying said weather data and timing data to a geographical route data for calculating projected weather data (1102), and outputting weather data, wherein weather data comprises at least one of past, present, forecasted and projected weather (1103).

Figure 13:
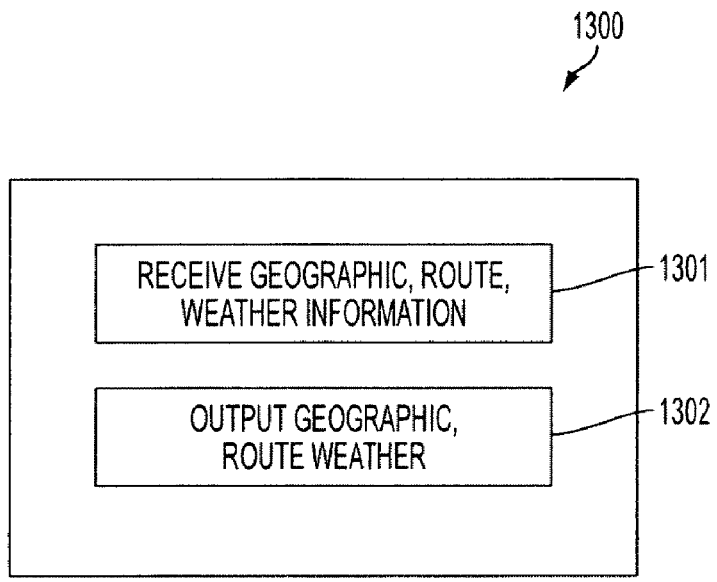
FIG. 13 illustrates a block diagram shows the primary components for outputting weather data according to an exemplary embodiment of the present invention.

FIG. 13 shows a block diagram for a method for outputting weather information (1300) comprising receiving geographic region information, wherein geographic region information comprises at least a map (1301), displaying the geographic region information in a geographic display of a graphical user interface (1302), receiving geographic route data (1301), displaying the route data on the map in the geographic region display (1302), receiving weather data (1301), wherein weather data comprises at least one of past, present, forecasted and projected weather data, and displaying weather data (1302) in at least one of tabular, geographic, graphical, textual and vector formats comprised in a weather data display, wherein the weather data display is at least one of displayed on a layer superimposed over the geographic region display and displayed separately from the geographic region display.

Figure 14:
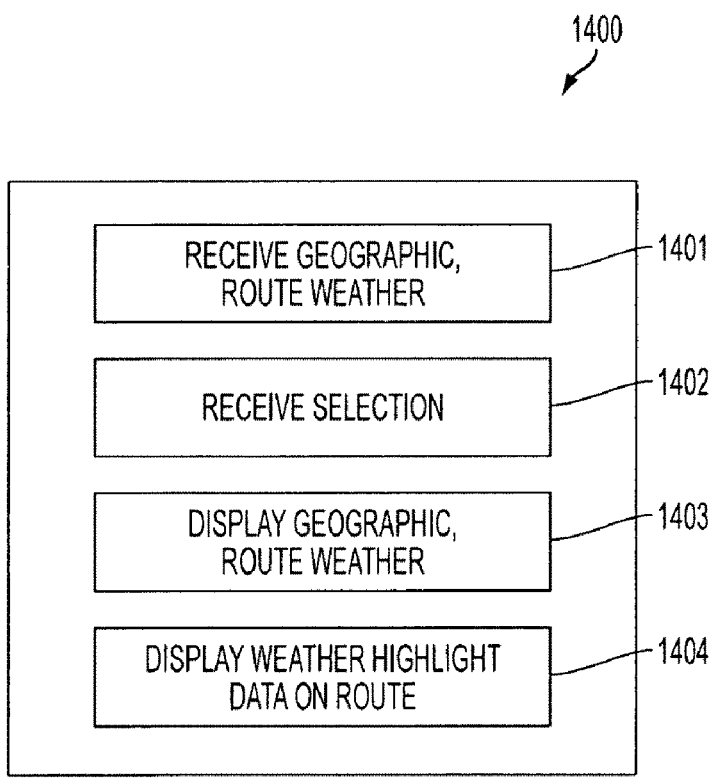
FIG. 14 illustrates a block diagram shows the F primary components for outputting weather data for user's selection(s) according to an exemplary embodiment of the present invention.

FIG. 14 shows a method for outputting weather information (1400), the method comprising receiving geographic region information (1401), wherein geographic region information comprises at least a map, displaying said geographic region information (1403) in a geographic region display, receiving geographic route data (1401), displaying route data in the geographic region display (1403), receiving data selection information (1402) comprising at least one of geographical position coordinate in the geographic region display, time and route waypoint for allowing user to display weather data for at least one of selected points and times along a route, receiving weather data relating to the received data selection information, displaying weather data (1404) in at least one of tabular, geographic, graphical, textual and vector formats comprised in a weather data display, for selected points and times along the route, highlighting, simultaneous to displaying weather data (1404), weather data on the route in the geographic region display, wherein the weather data display is at least one of displayed on a layer superimposed over the geographic region display and displayed separately from the geographic region display.

According to exemplary embodiments, weather data can be provided related to a user's position at the time the data is examined, be it stationary or mobile or current or projected, on the user's device. According to exemplary embodiments of the present invention, user's would be able to make decisions by observing the project weather. For example, mariners on a boat (or water based vessel) would be able to know about the approaching weather that can impact the boat on the route and may be able to plan an alternate route in order to avoid the weather condition. Pilots would be able to know about approaching weather that can impact the airplane and would be able to take an alternate route to avoid the weather pattern. A golfer on a golf course may be able to know about the approaching weather along their golf route and may be able to alter their route in order to avoid the weather pattern. If a user is underway and finds themselves in the weather pattern (for example, in the middle of a rain storm), the weather projection according to the decision system can help the user determine when they may emerge from the weather pattern.

According to exemplary embodiments, decision system can be used for providing weather data for land-based vehicles (for example, cars, trucks, vans, motorcycles, tanks, buses, lawnmowers, carts, hovercrafts and any object that travels from a first location to a second location). For example, the decision system can allow a truck to know of weather patterns along their route so that they may be able to plan an alternate route in order to avoid the weather condition.

The decision system can be adapted to one or more geographic locations on earth. According to an exemplary embodiment, the decision system may receive weather data from entities such as the National Weather Service, Doppler radar scans from private providers and any other vendor, organization, distributor or entity that provides data that can be used for determining weather conditions.

The above-described exemplary embodiments of an apparatus and method for transmitting/receiving link status may be recorded in computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, et and so on, including a carrier wave transmitting signals specifying the program instructions, data structures, et and so on. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

While the present invention has been shown and described with reference to particular illustrative embodiments, it is not to be restricted by the exemplary embodiments but only by the appended claims and their equivalent. It is to be appreciated that those skilled in the art can change or modify the exemplary embodiments without departing from and the scope and spirit of the present invention.

What is claimed is:

1. A method for outputting weather information for navigating a vehicle comprising:
receiving geographic region information for a region specified by a user;
presenting the geographic region in a graphical user interface;
receiving at least one of past, present and forecasted weather data for the geographic region;
storing received weather data;
receiving a geographical route data for navigating a vehicle from the user;
storing the route data;
obtaining criteria for calculating projected weather data projected on the route;
calculating said projected weather data for one or more selected points along the stored route at a specified applicable time input by the user for each selected point;
storing calculated projected weather data related to the selected points; and
outputting said projected weather data,
wherein outputting comprises simultaneously displaying said projected weather data for the selected points on the stored route, in accordance with the specified applicable time for each selected point along the stored route.

2. The method of claim 1, wherein weather data comprises conditions comprising at least one of wind, wave height, wave direction, wave period, swells, sea currents, sea surface temperatures, air temperature, visibility, precipitation, cloud cover, sea ice, atmospheric vorticity, 500 mile contours, fronts, lightning, cyclones, hurricanes, tornadoes and other weather, surrounding and environmental conditions.

3. The method of claim 1, wherein the route comprises a plurality of geographical points for navigating the vehicle.

4. The method of claim 1, wherein the criteria comprises at least one of exclusion conditions and vehicle data.

5. The method of claim 4, wherein exclusion condition comprises at least one of maximum winds, maximum waves, maximum swells, maximum discomfort index, maximum motion period and maximum motion amplitude.

6. The method of claim 5, wherein motion period and amplitude comprise at least one of roll and pitch data.

7. The method of claim 5, wherein the discomfort index provides a means for evaluating the relative comfort of various positions or routes given the wave conditions at said positions or on said routes.

8. The method of claim 7, wherein the discomfort index comprises a wave height divided by wave period as felt by a vehicle moving or fixed.

9. The method of claim 8, wherein the discomfort index is adjusted by factors related to at least one of vessel heel angle, vessel roll amplitude and vessel roll frequency.

10. The method of claim 4, wherein vehicle data comprises one or more of vessel speed versus wind angle for stated wind speeds, vessel speed versus engine operating conditions, vessel response to vessel-felt sea period, vessel-felt swell period for each point along the route, vessel speed versus wind angle, vessel roll amplitude versus sea or swell angle or sea or swell amplitude.

11. The method of claim 1, wherein the geographical route definition comprises waypoints and times at each waypoint, wherein waypoints comprises at least one of start, turns, layover, and destination waypoints.

12. The method of claim 1, wherein calculating projected weather data for each point along the route at a given time comprises applying weather data and timing data to the geographical route data.

13. The method of claim 12, wherein calculating projected weather for each point comprises interpolating available weather data to the point and to the time a vehicle is projected to be at the point for any point on the route.

14. The method of claim 13, wherein the vehicle comprises at least one of a vessel, boat, airplane, truck, car, motorcycle, van, submarine and any object moving from one geographic location to another.

15. The method of claim 1, wherein outputting weather information comprises
displaying geographic region information in a graphical display, wherein the geographic region information comprises at least a map;
displaying the route data in the display; and
displaying weather data in at least one of tabular, geographic, graphical, textual and vector formats comprised in a weather data display;
wherein the weather data display is at least one of displayed on a layer transposed onto the geographic region display and displayed separately from the geographic region display.

16. The method of claim 15, wherein displaying weather data in a vector format comprises displaying weather data selected as a vector for any point on the route in polar coordinates relative to the geographic region and for an applicable time for that point.

17. The method of claim 16, wherein the geographic reference comprises one of true north, magnetic north, a fixed vehicle position, a moving vehicle position, a fixed geographic point, an intended course, a vessel heading, and any reference selected by user.

18. The method of claim 15, wherein displaying weather data in a vector format comprises one or more of displaying vector sum or difference plots whose resultant vector originates at the route point the user is interrogating on the route applicable to a time a vehicle would be at that point, and displaying weather data in reference to true or magnetic north coordinates, referenced to vessel coordinates, referenced to the desired track or any other route point for any route point of the route the user references for the time the vehicle is projected to be at that point.

19. The method of claim 16, wherein displaying weather data comprises displaying vector summation of one or more of compass heading, wind speed, wind direction, vessel speed through the water, currents of any type, anticipated sideslip, magnetic variation, compass deviation and/or any other effects on vessel speed and direction, for yielding a resultant forecasted vector applicable to any point on the route.

20. The method of claim 16, wherein weather data is derived from data array files.

21. The method of claim 1, wherein outputting weather information comprises
displaying geographic region information in a geographic display, wherein geographic region information comprises at least a map;
displaying the route data in the geographic region display;
receiving data selection information comprising at least one of geographical position coordinates, time and route waypoint(s) for allowing the user to display weather data for at least one of selected points and times along a route;
retrieving stored weather data relating to the received data selection information;
displaying weather data in at least one of tabular, geographic, graphical, textual and vector formats, for selected points and times along the route;
highlighting, simultaneous to displaying weather data, retrieved stored weather data on the route in the geographic region display;
wherein the weather data display is at least one of display superimposed over the geographic region display and displayed separately from the geographic region display.

22. The method of claim 21, wherein data selection information comprises data that is inputted by clicking on points using a pointer and/or entered by a user.

23. The method of claim 1, wherein receiving the geographic region comprises receiving geographic data for a geographic region on earth.

24. The method of claim 1, wherein receiving weather data comprises receiving data from a second party data provider via at least one of a wireless and a wired connection.

25. The method of claim 24, wherein weather data comprises at least one of wind, wave height, wave direction, wave period, swells, sea currents, sea surface temperatures, air temperature, visibility, precipitation, cloud cover, sea ice, atmospheric vorticity, 500 mile contours, fronts, lightning, cyclones, hurricanes, tornadoes and other weather, surrounding and environmental conditions.

26. The method of claim 1, wherein said specified applicable time for each point is the time at which a vehicle is projected or proposed to arrive at said selected point or did arrive at said selected point.

27. A method for providing individualized, location specific weather information for navigating a vehicle, the method comprising:
receiving a request from a user for said weather information;
receiving a route from the user;
receiving weather data for the route;
calculating projected weather information for one or more selected points on the received route at a specified applicable time input by the user for each selected point based on the received weather data; and
presenting the projected weather information for the selected points on the received route, to the user for an applicable time for each selected point on the route,
wherein presenting comprises simultaneously displaying the projected weather data for the selected points on the route, in accordance with the specified applicable time for each selected point along the route.

28. The method of claim 27, wherein the specified applicable time for each point comprises the time at which the vehicle is projected or proposed to arrive at said point or did arrive at said point.

29. A computer readable medium having stored thereon executable instructions for a method for displaying information, the method comprising:
instructions for receiving geographic region information for a region specified by a user;
instructions for presenting the geographic region in a graphical user interface;
instructions for receiving at least one of past, present and forecasted weather data for the geographic region;
instructions for storing received weather data;
instructions for receiving a geographical route data for navigating a vehicle, from the user;
instructions for storing the route data;
instructions for obtaining criteria for calculating projected weather data projected on the route;
instructions for calculating said projected weather data for one or more selected points along the stored route at a specified applicable time input by the user for each selected point;
instructions for storing calculated projected weather data related to the selected points; and
instructions for outputting said projected weather data, wherein outputting comprises simultaneously displaying said projected weather data for the selected points on the route, in accordance with the specified applicable time for each selected point along the route.

30. A method for calculating projected weather data for one or more selected points along a route at a given time, the method comprising
receiving past, present and forecasted weather data;
applying said weather data and timing data to one or more selected points on the route a geographical route data for calculating projected weather data; and
outputting weather data, wherein weather data comprises at least one of past, present, forecasted and projected weather, and
wherein outputting comprises simultaneously displaying projected weather data for the selected points on the route, in accordance with specified applicable time for each selected point along the route.

31. A method for outputting weather information comprising
receiving geographic region information, wherein geographic region information comprises at least a map;
displaying the geographic region information in a geographic of a graphical user interface,
receiving a geographic route;
displaying the route on the map in the geographic region;

receiving weather data, wherein weather data comprises at least one of past, present, forecasted and projected weather data; and displaying weather data in at least one of tabular, geographic, graphical, textual and vector formats comprised in a weather data display;

wherein the weather data display is at least one of displayed on a layer superimposed over the geographic region display and displayed separately from the geographic region display, wherein displaying weather data comprises simultaneously displaying projected weather data for the selected points on the route, in accordance with specified applicable time for each selected point along the route.

32. The method of claim 31, wherein the geographic region information comprises at least one weather condition adapted to display along on map.

33. The method of claim 31, wherein displaying weather data in a vector format comprises displaying weather data selected as a vector for any point on the route in polar coordinates relative to the geographic region.

34. A method for outputting weather information, the method comprising:
receiving geographic region information, wherein geographic region information comprises at least a map;
displaying said geographic region information in a geographic region display;
receiving a geographic route;
displaying the route in the geographic region display;
receiving data selection information comprising at least one of geographical position coordinates, time and route waypoint for allowing user to display weather data for at least one of selected points on the route;
receiving weather data relating to the received data selection information;
displaying weather data in at least one of tabular, geographic, graphical, textual and vector formats comprised in a weather data display for selected points in accordance with the selected time for each selected points along the route;
highlighting, simultaneous to displaying weather data, weather data on the selected points on the route in the geographic region display;
wherein the weather data display is at least one of displayed on a layer superimposed over the geographic region display and displayed separately from the geographic region display.

35. The method of claim 34, wherein data selection information comprises data that is inputted by clicking on points using a pointer and/or entered by a user.

36. The method of claim 34, wherein the geographic region information comprises at least one weather condition adapted to display along on the map.

37. A computer readable medium having executable instructions for calculating projected weather data for one or more selected points along a geographical route, comprising instructions for:
receiving past, present and forecasted weather data;
applying said weather data and timing data to one or more selected points on the geographical route for calculating projected weather data on the selected points at a specified applicable time input by the user; and
outputting projected weather, and
wherein outputting comprises simultaneously displaying the projected weather data for the selected points on the route, in accordance with the specified applicable time for each selected point along the route.

38. An apparatus for outputting weather information, the apparatus comprising:
a transceiving unit for receiving and sending data, wherein the transceiving unit comprises steps for:
receiving geographic region information, wherein geographic region information comprises at least a map,
receiving a geographic route, and
receiving weather data for one or more selected points on the route for a specified applicable time input by the user for each selected point, wherein weather data comprises at least one of past, present, forecasted and projected weather data; and
a display unit for outputting weather information, wherein the display unit comprises steps for:
displaying the geographic region information in a geographic region display of a graphical user interface,
displaying the route on the map in the geographic region display, and
displaying weather data in at least one of tabular, geographic, graphical, textual and vector formats comprised in a weather data display wherein the weather data display is at least one of displayed on a layer superimposed over the geographic region display and displayed separately from the geographic region display,
wherein displaying weather data comprises simultaneously displaying the projected weather data for the selected points on the route, in accordance with the specified applicable time for each selected point along the route.

39. An apparatus for outputting weather information, the apparatus comprising:
a transceiving unit for receiving and sending data, wherein the transceiving unit comprises steps for:
receiving geographic region information, wherein geographic region information comprises at least a map,
receiving a geographic route, and
receiving weather data for one or more selected points on the route for a specified applicable time input by the user for each selected point; and
a display unit for displaying weather information, wherein the display unit comprises steps for:
displaying said geographic region information in a geographic region display,
displaying the route in the geographic region display,
displaying weather data in at least one of tabular, geographic, graphical, textual and vector formats comprised in a weather data display, for selected points and times along the route, and
highlighting, simultaneous to displaying weather data, weather data on the route in the geographic region display, wherein the weather data display is at least one of displayed on a layer superimposed over the geographic region display and displayed separately from the geographic region display, and
wherein displaying weather data comprises simultaneously displaying the weather data for the selected points on the route, in accordance with the specified applicable time for each selected point along the route.

* * * * *